United States Patent [19]

Mönch

[11] Patent Number: 5,019,017
[45] Date of Patent: May 28, 1991

[54] MONITORING ARRANGEMENT FOR A DRIVE BELT

[75] Inventor: Uwe Mönch, Bensheim, Fed. Rep. of Germany

[73] Assignee: Gebr. Hofmann GmbH & Co. KG Maschinenfabrik, Pfungstadt, Fed. Rep. of Germany

[21] Appl. No.: 474,390

[22] Filed: Feb. 5, 1990

[30] Foreign Application Priority Data

Feb. 10, 1989 [DE] Fed. Rep. of Germany ....... 3904017

[51] Int. Cl.$^5$ .......................... F16H 7/00; G01L 5/10
[52] U.S. Cl. ................................. 474/102; 73/862.39
[58] Field of Search ....................... 474/101, 102, 103; 73/862.19, 862.39; 340/675, 676, 686, 870.37; 226/24, 27, 45, 100

[56] References Cited

U.S. PATENT DOCUMENTS

| | | | |
|---|---|---|---|
| 3,452,853 | 7/1969 | Mabon | 226/45 X |
| 4,087,800 | 5/1978 | Lee | 340/259 |
| 4,249,080 | 2/1981 | Pritchett et al. | 250/557 |
| 4,372,172 | 2/1983 | Gombócz et al. | 73/862.39 |
| 4,404,560 | 9/1983 | Williams, Jr. | 340/870.37 |
| 4,557,372 | 12/1985 | Rajagopal | 198/807 |

FOREIGN PATENT DOCUMENTS

| | | |
|---|---|---|
| 3339209 | 10/1983 | Fed. Rep. of Germany . |
| 3413288 | 4/1984 | Fed. Rep. of Germany . |
| 3418753 | 4/1984 | Fed. Rep. of Germany . |
| 3538219 | 10/1985 | Fed. Rep. of Germany . |
| 62-72949 | 4/1987 | Japan . |
| 2016173 | 9/1979 | United Kingdom . |

Primary Examiner—Thuy M. Bui
Attorney, Agent, or Firm—Cushman, Darby & Cushman

[57] ABSTRACT

In a monitoring arrangement for a belt drive in which a torque produced by a drive motor is transmitted by way of an endless drive belt to a rotary member to be rotated, the drive belt is provided in its longitudinal direction with markings which are adapted to be sensed and which are disposed at equal spacings from each other. First and second sensing members are arranged at a given spacing from each other in succession in the direction of travel of the belt and are operable to sense the markings on the drive belt as they move past the sensing members. The sensing members output corresponding sensing signals in response to the markings. A signal evaluation member is connected to the first and second sensing members, for interrelating the sensing signals in respect of time in dependence on the spacing between the first and second sensing members and the speed of movement of the drive belt.

44 Claims, 2 Drawing Sheets under the control of a signal which is evaluated, the monitoring arrangement being capable of monitoring a belt drive which is subjected to fatigue and wear, in such a way that an alarm signal can be outputted in good time before the drive belt breaks, and further in such a way as to be able to detect faults in the drive belt, so that it can be replaced in good time. Before that however, while the drive belt is still in use, the monitoring arrangement can give information about the angular position of the driven rotary member insofar as the position of the markings on the belt drive corresponds to an angular position of the rotary member to be driven.

MONITORING ARRANGEMENT FOR A DRIVE BELT

BACKGROUND OF THE INVENTION

The present invention is concerned generally with driving rotary members in rotation, for carrying out various operations thereon such as testing or measurement or machining operations.

For the purposes of driving rotary members of any kind in rotation, it is appropriate to use belt drives in which the drive belt is passed around the rotary member to be driven thereby, or the drive belt bears against the rotary member in substantially tangential relationship therewith. A belt drive is generally preferred whenever the situation involves driving in rotation rotary members which may be of different diameters. To provide for such a drive to a rotary member, it is only necessary for the rotary member to have a surface portion of circular cross-section, against which the drive belt can therefore bear for the purposes of driving the rotary member. The drive belt can be used not only for transmitting drive moments from a drive motor to the rotary member, but also for transmitting a braking moment to the rotary member in order to bring it to a halt. Particularly when dealing with rotary members which do not include any drive members or portions of their own, for example rotary members in the form of tubes or cylindrical rotary members, a belt drive is frequently used instead of a universally jointed shaft drive.

Particularly when the belt drive involves the transmission of high levels of torque, and particularly when the belt drive is in use over a prolonged period of time, the drive belt may suffer from a considerable amount of wear and may also be subject to fatigue of the material forming the drive belt. Those considerations not only result in impaired transmission of the torque, but they can also give rise to a major risk factor in terms of safety, in particular in the event of the drive belt suffering from a breakage as a result of wear and/or fatigue thereof.

SUMMARY OF THE INVENTION

An object of the present invention is to provide a monitoring arrangement for a belt drive, which permits material fatigue or the risk of the drive belt breaking to be detected in good time.

Still another object of the present invention is to provide a monitoring apparatus for monitoring a belt drive for driving a rotary member in rotation, which is of a simple nature while affording reliable monitoring results.

Still another object of the present invention is to provide an arrangement for monitoring a belt drive, which is capable of acting as a safety device in relation thereto.

Still a further object of the present invention is to provide an arrangement for monitoring a belt drive for driving a rotary member in rotation, which is capable of providing information about the angular position of the driven rotary member.

In accordance with the present invention these and other objects are achieved by a monitoring arrangement for a belt drive in which a torque supplied by a drive motor is transmitted by way of an endless drive belt to a rotary member to be rotated, wherein the drive belt is provided in its longitudinal direction with markings which are adapted to be sensed and which are disposed at equal spacings form each other. Arranged in succession and at a given spacing from each other in the direction of travel of the belt are first and second sensing means for sensing the markings on the drive belt and for outputting corresponding sensing signals. Connected to the first and second sensing means is a signal evaluation means in which the sensing signals which correspond in regard to their periodicity to the spacings between the markings are interrelated to each other in respect of time in dependence on the spacing between the first and second sensing means and the speed of travel of the drive belt.

It has been found that material fatigue phenomena, wear or defects in respect of the drive belt manifest themselves as variations in the length of the drive belt. When that happens, the spacings between the markings which were disposed on the drive belt at uniform spacings from each other when the drive belt was in its original and unused condition inevitably also change. When the spacings between the markings on the drive belt alter in that way, the time sequence of the signals which are triggered off by the markings as they pass the first and second sensing means also changes. If the signals are in pulse form, the train of pulses outputted by the first and second sensing means are identical to each other in regard to the time sequence of the pulses, when the drive belt is in a satisfactory condition. That means that the pulse trains from the first and second sensing means have the same uniform time displacement relative to each other or the respective pulses constituting the two pulse trains produced by the first and second sensing means are outputted simultaneously. Particularly if, in accordance with a preferred feature of the invention, the spacing between the first and second sensing means, in the direction of travel of the belt, is an integral multiple of the respective spacings between the markings on the drive belt, the arrangement can produce two pulse trains, the pulses of which are outputted simultaneously by the first and second sensing means. The simultaneity of the drive pulses or the constant time shift in respect of the pulses of the two pulse trains outputted by the first and second sensing means is detected by the signal evaluation means connected to the sensing means.

If now the length of the drive belt increases as a result of material fatigue or wear or some other defect which has occurred in the drive belt then at the corresponding position on the drive belt, at which the fatigue, wear or defect has occurred, a change and in particular an increase in the spacing between the markings disposed in that part of the belt, will inevitably occur.

The variation in the spacing between the markings, as indicated above, manifests itself in a modified sequence of the corresponding pulses in the first and second pulse trains outputted by the first and second sensing means. That variation in the time shift between the corresponding pulses in the two pulse trains is detected by the signal evaluation means, and, when the variation in respect of time exceeds a predetermined threshold value, the signal evaluation means will actuate, for example, an alarm device. The drive belt can then be replaced before it suffers from even more damage or wear, and consequently becomes a safety risk.

It will be seen therefore that the monitoring arrangement according to the invention can be used as a safety device for monitoring a belt drive.

Another possible use of the monitoring arrangement according to the invention provides that information about the respective angular position of the rotary member being driven by the belt drive can be obtained from the markings on the drive belt. That is achieved by the provision of a zero reference marking on the rotary member being sensed by way of a further sensing means, and coupled to the periodic signal derived from the markings on the drive belt.

The signal evaluation means can then be operable to produce a single periodic signal sequence from the two periodic signal sequences produced by the sensing means which sense the markings on the belt. The single periodic signal sequence may be for example a pulse train in which the pulses are at the same spacings from each other, in dependence on the markings on the drive belt. That pulse train can be applied to a counter which also receives an output pulse from the above-mentioned zero point sensing means which senses the zero reference marking on the rotary member. The sensing pulse outputted by the zero point sensing means can serve as a respective resetting pulse or starting pulse so that the periphery of the rotor is subdivided by the pulses which are delivered by the signal evaluation means and which are derived from the markings on the drive belt. In that way, the rotary member is also divided up in terms of angular segments thereof and the respective condition of the counter therefore gives the corresponding angular positioning of the rotating rotary member.

If it is desired that the rotary member is to be stopped in a given angular position, that angular position can be compared to the corresponding count condition of the counter and the drive motor or a braking means can be actuated in such a way as to stop the rotary member when the count condition of the counter coincides with the predetermined count value which corresponds to the desired angular position of the rotary member. That procedure can be used, for example, when a rotary member is to be turned into a given angular position for a machining operation which is to be carried out on the rotary member, for example, an unbalance compensating operation.

Further objects, features and advantages of the present invention will be apparent from the following description of preferred embodiments thereof.

DESCRIPTION OF PREFERRED EMBODIMENTS

Figure 1:
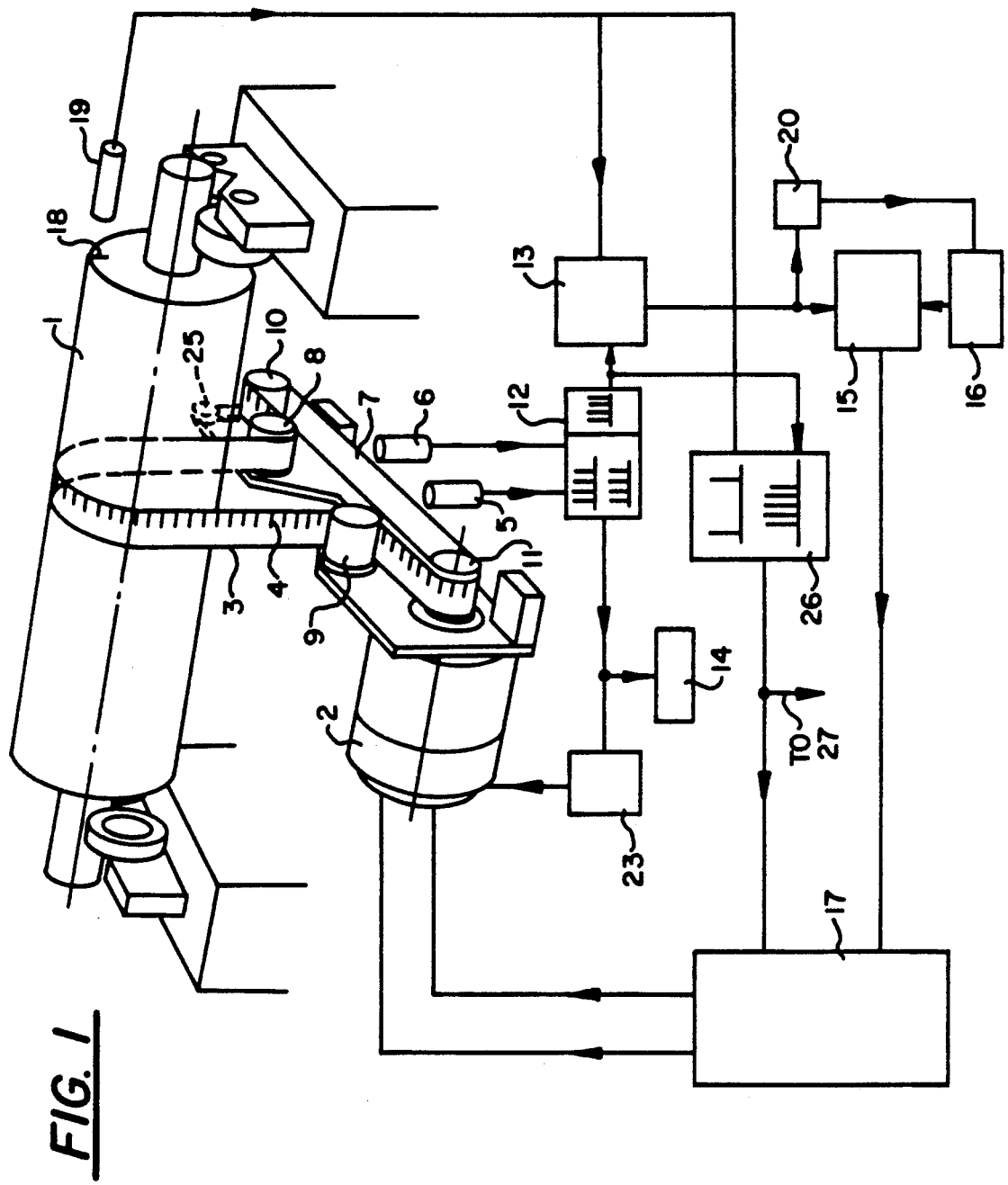
FIG. 1 is a diagrammatic perspective view of an embodiment of the invention.

FIG. 1 shows a rotary member, which is to be rotated for the purposes of testing same or for carrying out measurements or machining operations thereon. The rotary member 1 is to be appropriately driven in rotation by a drive motor 2, for example an electric motor, by way of a drive belt 3. For the purposes of transmitting the torque from the motor 2 to the rotary member 1, the drive belt 3 passes around the periphery of a suitable part of the rotary member 1, as can be clearly seen from the drawing. The drive belt 3 is also passed around a drive roller 11 which is carried on the shaft of the drive motor 2, and direction-changing or guide rollers 8, 9 and 10.

As shown in FIG. 1, markings 4 are provided on the drive belt, preferably on the outward side thereof, that is to say at the side thereof which does not come into contact with the surface of the rotary member 1. The markings 4 are in the form of lines which extend transversely with respect to the direction of movement of the drive belt 3 and are each at the same spacing from each other. It is sufficient for the markings 4 to be disposed along only one of the two edges of the drive belt, in the manner shown in FIG. 1.

In the embodiment illustrated in FIG. 1, the drive belt 3 extends along a straight portion as indicated at 7 between the guide roller 11 which also forms the drive roller on the shaft of the drive motor 2, and the guide roller 10. Provided in the region of that straight portion of the drive belt 3 are first and second sensing means 5 and 6 which are operable to sense the markings 4 on the drive belt 3 and which are at a given spacing from each other in the direction of travel of the drive belt 3. Preferably, the spacing between the sensing means 5 and 6 is such that it is an integral multiple of the spacing between each two adjacent markings 4. Each sensing means 5 and 6 outputs a sensing signal which is of a periodicity dependent on the spacings of the markings from each other. The output signal is preferably a series of sensing pulses which are delivered by the two sensing means 5 and 6. If the spacing of the two sensing means 5 and 6 from each other is an integral multiple of the spacing between each two adjacent markings 4, then the two sensing means 5 and 6 can output two pulse trains, the pulses of which are coincident with each other in respect of time. The sensing signals outputted by the sensing means 5 and 6 are passed to a signal evaluation means 12 for detecting identity in respect of time of the periodicities of the two sensing signals outputted by the sensing means 5 and 6, in particular, identity in respect of time as between the respective pulses of the two pulse trains.

It is also possible however, for the sensing means 5 and 6 to supply sensing signals, the periodicities of which are not identical to each other in respect of time but are at a constant spacing from each other in respect of time, while the belt drive is operating. For example, when the sensing signal is in pulse form, the pulses of the two pulse trains may be displaced relative to each other by a constant time. That may also be detected by the signal evaluation means 12.

If the drive belt suffers from material fatigue at one or possibly more locations therein, as a result, the drive belt necessarily experiences an increase in its length, which in turn results in a variation in the spacing between the corresponding markings 4 provided on the drive belt 3 in that region. This will manifest itself in the sensing signals, which are dependent on the spacings between the markings 4, outputted by the two sensing means 5 and 6. The two sensing signals outputted by the sensing means 5 and 6 will then no longer be coincident with each other in respect of time, or have the constant time difference relative to each other, at the corresponding location on the drive belt.

If now the variation in respect of time in the succession of signals and in particular, the pulses in the two pulse trains exceeds a predetermined value, the signal evaluation means 12 actuates an alarm device 14. The alarm device will then show in good time that the drive belt 3 is suffering damage and is thus becoming or has become defective, and must be replaced by a new belt. It is also possible for the signal evaluation means 12 to actuate a shut-off device 23 for stopping the drive motor 2.

The sensing means 5 and 6 may be any suitable sensing means, for example, optical, electrical or magnetic sensing means. The markings are of a suitable nature such as to appropriately cooperate with the sensing means.

The signals which are outputted by the first and second sensing means 5 and 6 and which are dependent in regard to their periodicity on the spacings between the markings 4 on the drive belt 3 may also be evaluated for monitoring the respective angular position assumed by the rotary member 1 in the course of the rotary movement thereof. For that purpose, a pulse train is formed in the signal evaluation means 12 from the sensing signals, in particular, sensing signals in pulse form, which are outputted by the sensing means 5 and 6. The pulse train comprises pulses with a constant time interval therebetween, in dependence on the markings 4 on the drive belt 3. The pulse train is applied to a counter indicated at 13 in FIG. 1.

The illustrated arrangement also includes a zero point sensing means 19 for sensing a zero marking indicated at 18 on the rotary member 1. Preferably, the zero point sensing means 19 produces a pulse in each revolution of the rotary member 1 in dependence on sensing of the zero marking 18 thereby. The pulse produced in that way by the zero point sensing means 19 is also applied to the counter 13.

The sensing pulse from the zero point sensing means 19 performs the function of a start or resetting pulse for the counter 13 so that, upon each revolution of the rotary member 1, the counter 13 effects fresh counting of the pulses delivered by the signal evaluation means 12. The respective count values in the counter 13 correspond to angular portions or peripheral segments of the rotary member 1. In that way, the periphery of the rotary member can be divided up into angular portions or peripheral length segments which are determined by the count values in the counter 13. Those count values can be passed to a reproducing or display means 20 so as to provide information at any time about the respective angular position of the rotary member 1.

If the rotary member 1 is to be stopped in a specific angular position which can be held in store in a suitable storage device as indicated at 16, the respective count values in the counter 13 are also applied to a comparison means 15 in which the value stored in the storage means 16 is compared to the respective counter condition. In dependence on the comparison result, the comparison means 15 actuates a motor control means 17 which brakes the motor 2 to bring the rotary member 1 to a stop. whereby the rotary member 1 is stopped at the angular position thereof, which was stored in the storage means 16. Instead of using the motor 2 to bring the rotary member 1 to a halt, it is also possible for a suitable braking device to be actuated to stop the rotary member 1 in the desired angular position.

The angular position which is stored in the storage means 16 may have been ascertained as a position at which the rotary member suffers from an unbalance effect, the unbalance having been ascertained in a measuring operation. The storage means 16 then stores the positions of the unbalance of the rotary member, and the rotary member is then moved into the appropriate angular position in which an unbalance-compensating operation such as a machining operation is to be carried out to remove the unbalance of the rotary member, with the rotary member being stopped in the appropriate position for that purpose by means of the above-described procedure.

However the above-described procedure may also be effected for turning the rotary member 1 into a given angular position for carrying out other working operations and other rotary member machining processes.

The angular information stored in the storage means 16 can also be obtained by evaluation of a count value supplied by the counter 13, during the rotary member measuring run.

In the embodiment illustrated in FIG. 1, it will be seen that the drive belt 3 passes and a considerable part of the peripheral surface of the rotor 1, in a substantially U-shaped configuration. It will be appreciated however that it is also possible for the monitoring arrangement in accordance with the present invention to be used in relation to a belt drive in which the drive belt 3 bears against the surface of the rotary member 1 in substantially tangential relationship therewith, for driving the rotary member 1 in rotation.

Figure 2:
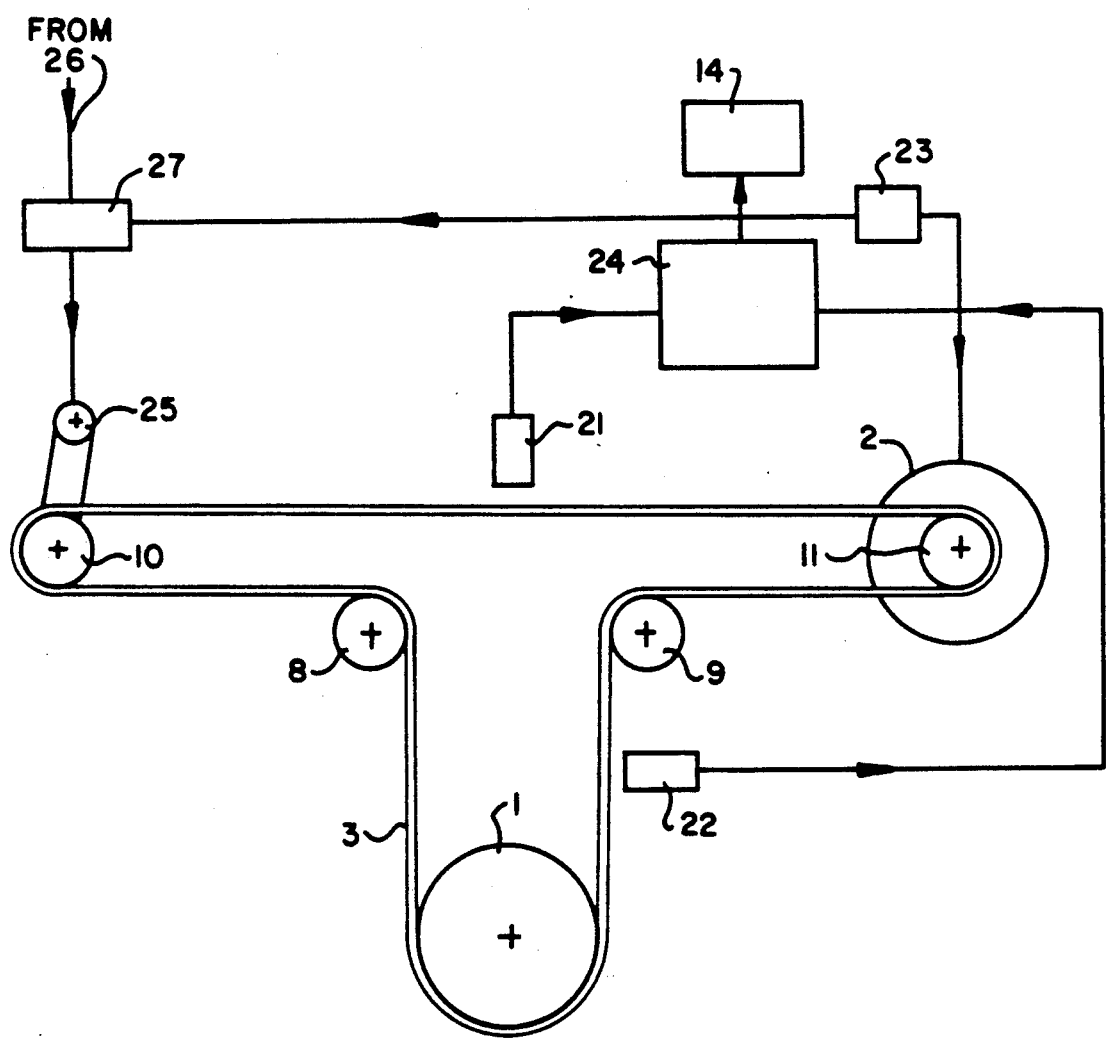
FIG. 2 is a diagrammatic view of another embodiment of the invention.

Reference will now be made to FIG. 2 showing a further sensing configuration in the form of an oscillation sensing means for detecting transverse oscillations of the drive belt 3. The oscillation sensing means comprises first and second measurement value generators or pick-ups 21 and 22. The one measurement value generator 21 is arranged adjacent the part of the path of the drive belt 3 in which the drive belt 3 is running back from the drive motor 2 to the rotary member 1, that is to say the part of the path of the drive belt in which the drive belt is not subjected to a substantial tensile force therein, thus constituting what may be termed the idle portion of the drive belt. The other measurement value generator 22 on the other hand is arranged adjacent the part of the path of the drive belt 3 in which the drive belt 3 runs from the rotary member 1 to the drive motor 2 and in which the torque produced by the drive motor 2 is being transmitted to the rotary member 1. That part of the drive belt is therefore in a condition of being subjected to a considerable tensile force.

Transverse oscillations, that is to say oscillations which are normal to the surface of the belt, can occur due to defective belt tensioning or due to defects in the belt and the material thereof. Transverse oscillations can also occur if, at high speeds of rotation, the drive belt reaches a condition in which it suffers from natural resonance. Transverse oscillations of a belt in that fashion can often be referred to as belt flutter.

The signals from the measurement value generators 21 and 22, which signals are proportional to the transverse oscillations or flutter of the drive belt 3, are applied to an oscillation signal evaluation circuit 24. The measurement value generators 21 and 22 are preferably in the form of capacitive units. The evaluation circuit 24 ascertains whether the transverse oscillations of the drive belt 3 are or are not above a tolerance value. When the tolerance value is exceeded, an alarm means 14 and/or a shut-off means 23 for shutting off the drive motor 2 is or are actuated.

The monitoring arrangement shown in FIG. 2 may be used on its own or in conjunction with the arrangement shown in FIG. 1.

In order to ensure that the drive belt 3 is satisfactorily guided and controlled, the arrangements shown in both FIG. 1 and FIG. 2 have a belt tensioning means 25 which cooperates with the guide roller 10. If the oscillation signal evaluation circuit 24 in FIG. 2 detects that a predetermined tolerance value, in particular in respect of the amplitude of the transverse oscillations of the drive belt 3, is being exceeded, then, as shown in FIG. 2, the control device 27 may be supplied with a corresponding signal from the oscillation signal evaluation means 24. Produced in that control means 27 is an output signal which actuates the belt tensioning means 25 to adjust the tension of the drive belt 3 until the drive belt 3 no longer suffers from transverse oscillations or such oscillations are within a permissible tolerance.

Preferably, the increase in the length of the belt which occurs when the drive belt 3 is re-tensioned in the above-discussed manner is monitored by the sensing means 5 and 6 and the signal evaluation means 12 connected thereto. That ensures that an increase in the length of the belt, caused by the re-tensioning operation, occurs only within the permissible tolerance value. In that connection, in particular, locally restricted increases in the length of the belt are also detected, as has already been described above.

Furthermore, a slip signal which is proportional to the slippage of the rotary member relative to the belt may be formed from sensing of the markings 4 on the belt and sensing of the zero marking 18 on the rotary member 1. The slip signal may be derived from the sensing signal which is formed in the signal evaluation means 12 and which corresponds to the markings 4, and the zero marking 18. In that operation, a variation in the time sequence of the sensing signal or sensing pulse corresponding to the zero marking 18 on the rotary member 1, and sensing signals corresponding to a revolution of the rotary member 1, is detected. That can be done in a time monitoring circuit as indicated at 26. As shown in FIG. 1, the time monitoring circuit 26 is connected to the output of the sensing means 19 and the output of the signal evaluation means 12. The time monitoring circuit 26 accordingly receives a pulse which corresponds to the zero marking 18 on the rotary member 1 and which, whenever it appears, indicates that the rotary member has performed a revolution, as well as the pulse train which is outputted at the output of the signal evaluation means 12 and which is also applied to the counter 13. In that procedure, the time monitoring circuit 26 detects the displacement in respect of time of the sensing pulses which are derived from the markings 4 on the drive belt 3, within a revolution of the rotary member, that is to say, within two sensing pulses which are produced by the sensing means 19 in response to the marking 18 on the rotary member 1, and the time monitoring circuit 26 thus forms a corresponding slip signal therefrom. That slip signal can be evaluated for the purposes of compensating for slippage and for that purpose, may be passed to the control means 17 with which the rotary member 1 is turned into a given angular position. The slip signal may additionally be applied to the control means 27 shown in FIG. 2, for actuating the belt tensioning means 25 for re-tensioning the drive belt 3 in dependence on the detected slip. In that way, any slip which has occurred can be removed again by suitable re-tensioning of the drive belt 3.

The above-described monitoring arrangement according to the invention can be usefully employed, in particular, in relation to belt drives in which high levels of torque are to be transmitted from the drive motor to the rotary member to be driven in rotation thereby.

It will be appreciated that the above-described constructions have been set forth solely by way of example and illustration of the principles of the present invention and that various modifications and alterations may be made therein without thereby departing from the spirit and scope of the invention.

I claim:

1. A monitoring arrangement for a belt drive including an endless drive belt for transmitting torque produced by a drive motor to a rotary member, comprising:
    a plurality of markings on the drive belt at at least substantially equal spacings from each other in the longitudinal direction of the belt, the marking being adapted to be sensed;
    first and second sensing means adapted to sense the markings on the drive belt and in response, output corresponding sensing signals in pulse form, the sensing means being arranged in succession and at a spacing from each other in a direction of travel of the drive belt;
    a signal evaluation means connected to the first and second sensing means receiving the sensing signals and for relating the sensing signals to each other in respect of time in dependence on the spacing between the first and second sensing means and a speed of travel of the drive belt and for outputting a signal evaluation means output signal;
    a zero reference marking on said rotary member;
    a pulse counter connected to the signal evaluation means for receiving said signal evaluation means output signal and for counting said sensing signal pulses; and
    a zero reference sensing means operatively coupled to said pulse counter for sensing said zero reference marking on said rotary member and for producing a zero reference signal and outputting said zero reference signal to said pulse counter, wherein said pulse counter produces and outputs an angular value signal corresponding to the respective positions of the rotary member in respect of an angle of rotation, wherein said rotary member is adapted to be stopped under the control of a count value of said counter, which corresponds to a desired position in respect of the angle of rotation and which is derived from the markings on the drive belt.

2. An arrangement as set forth in claim 1 whrein said drive belt includes a linearly extending portion and said first and second sensing means are disposed along said linearly extending portion of the drive belt.

3. An arrangement as set forth in claim 1 wherein the spacing between said first and second sensing means is an integral multiple of the respective spacing of the markings from each other.

4. An arrangement as set forth in claim 1 including an alarm means, wherein said signal evaluation means is adapted to actuate said alarm means when the sensing signals produced by the first and second sensing means differ from each other in respect of time by more than a predetermined value.

5. An arrangement as set forth in claim 1 including means for forming a slip signal which is proportional to slippage of the belt relative to the rotary member from sensing of the markings on the belt and said zero reference marking on the rotary member.

6. An arrangement as set forth in claim 5 including a belt tensioning means, wherein the belt tensioning means is actuated in dependence on said slip signal.

7. An arrangement as set forth in claim 5 wherein the slip signal is used for slip compensation purposes in angular positioning of the rotary member.

8. An arrangement as set forth in claim 1 and forth including an oscillation sensing means for sensing transverse oscillations of said drive belt.

9. An arrangement as set forth in claim 8 wherein said oscillation sensing means comprises a capacitive sensing means.

10. An arrangement as set forth in claim 8 wherein said oscillation sensing means comprises first and second measurement value generators, the first measurement value generator being disposed at a portion of the drive belt which is subjected to a tensile force and the other measurement value generator being disposed at an idle portion of the drive belt.

11. An arrangement as set forth in claim 1 and further including a shut-off means connected to said signal evaluation means for stopping the drive motor when a tolerance value in respect of elongation of the drive belt is exceeded.

12. An arrangement as set forth in claim 8 and further including a shut-off means connected to said oscillation sensing means for stopping the drive motor when a tolerance value in respect of transverse oscillations of the belt is exceeded.

13. An arrangement as set forth in claim 1 and including a belt tensioning means.

14. An arrangement as set forth in claim 13 and further comprising means for detecting transverse oscillations of said drive belt and for comparing said detected transverse oscillations with a predetermined tolerance, said belt tensioning means being adapted to be actuated to re-tension the belt in response to said transverse oscillations exceeding said predetermined tolerance.

15. An arrangement as set forth in claim 14 wherein said belt tensioning means is controlled by said detecting means for automatic actuation when said transverse oscillations exceed said predetermined tolerance.

16. An arrangement as set forth in claim 13 wherein said first and second sensing means for sensing the markings on the drive belt are adapted to monitor said drive belt in respect of admissible elongation thereof when said drive belt is re-tensioned by said belt tensioning means.

17. An arrangement as set forth in claim 16 wherein a slip signal is formed from a variation in a time sequence of a signal produced in dependence on the sensed zero reference marking on the rotary member and of the respective sensing signals which are obtained from the markings on the drive belt and which correspond to a respective circumference of the rotary member.

18. An arrangement as set forth in claim 17 wherein said slip signal forming means operate on a pulse train which is obtained from said sensing signals and which corresponds to a revolution of the rotary member.

19. An arrangement as set forth in claim 1 wherein said markings on said drive belt are in the form of lines extending transversely with respect to the direction of movement of the drive belt.

20. A monitoring arrangement for a belt drive including an endless drive belt for transmitting torque producing by a drive motor to a rotary member, comprising:
a plurality of markings on the drive belt spaced apart from each other in the longitudinal direction of the belt, the markings being adapted to be sensed;
first and second sensing means for sensing the markings on the drive belt and outputting corresponding sensing signals;
a signal evaluation means connected to the first and second sensing means for receiving the sensing signals and relating the sensing signals to each other; and
an oscillation sensing means having first and second measurement value generators for sensing transverse oscillations of said drive belt, the first measurement value generator being disposed at a portion of the drive belt which is subjected to a tensile force and the second measurement value generator being disposed at an idle portion of the drive belt.

21. An arrangement as set forth in claim 20 wherein said drive belt includes a linearly extending portion and said first and second sensing means are disposed in succession along said linearly extending portion of the drive belt in a direction of travel of the drive belt.

22. An arrangement as set forth in claim 20 wherein a spacing between said first and second sensing means is an integral multiple of the respective spacing of the markings from each other.

23. An arrangement as set forth in claim 20 including an alarm means, wherein said signal evaluation means relates the sensing signals to each other in respect of time in dependence on a spacing between the first and second sensing means and a speed of travel of the drive belt and is adapted to actuate said alarm means when the sensing signals produced by the first and second sensing means differ from each other in respect of time by more than a predetermined value.

24. An arrangement as set forth in claim 20 wherein said markings on said drive belt are in the form of lines extending transversely with respect to the direction of movement of the drive belt.

25. An arrangement as set forth in claim 20 wherein said oscillation sensing means comprises a capacitive sensing means.

26. An arrangement as set forth in claim 20 and further including a shut-off means connected to said signal evaluation means for stopping the drive motor when a tolerance value in respect of elongation of the drive belt is exceeded.

27. An arrangement as set forth in claim 20 and further including a shut-off means connected to said oscillation sensing means for stopping the drive motor when a tolerance value in respect of transverse oscillations of the belt is exceeded.

28. An arrangement as set forth in claim 20 and including a belt tensioning means.

29. An arrangement as set forth in claim 28 and further comprising means for detecting transverse oscillations of said drive belt and for comparing said detected transverse oscillations with a predetermined tolerance, said belt tensioning means being adapted to be actuated to re-tension the belt in response to said transverse oscillations exceeding said predetermined tolerance.

30. An arrangement as set forth in claim 29 wherein said belt tensioning means is controlled by said detecting means for automatic actuation when said transverse oscillations exceed said predetermined tolerance.

31. An arrangement as set forth in claim 28 wherein said first and second sensing means for sensing the markings on the drive belt are adapted to monitor said drive belt in respect of admissible elongation thereof when said drive belt is re-tensioned by said belt tensioning means.

32. A monitoring arrangement for a drive belt including an endless drive belt for transmitting torque produced by a drive motor to a rotary member, comprising:

a plurality of markings on the drive belt spaced apart from each other in the longitudinal direction of the belt, the markings being adapted to be sensed;

first and second sensing means for sensing the markings on the drive belt and outputting corresponding sensing signals in pulse form;

a signal evaluation means connected to the first and second sensing means for receiving the sensing signals and relating the sensing means to each other in respect of time in dependence on the spacing between the first and second sensing means and the speed of travel of the drive belt and for outputting a signal evaluation means output signal;

a zero reference marking on said rotary member;

a zero reference sensing means for sensing said zero reference marking on said rotary member and for producing and outputting a zero reference signal; and slip signal forming mean operatively coupled to said zero reference sensing means and said signal evaluation means for receiving said zero reference signal and said signal evaluation means output signal and for forming a slip signal which is proportional to slippage of the belt relative to the rotary member from sensing of the markings on the belt and said zero reference marking on the rotary member.

33. An arrangement as set forth in claim 32 wherein said drive belt includes a linearly extending portion and said first and second sensing means are disposed in succession along said linearly extending portion of the drive belt in a direction of travel of the drive belt.

34. An arrangement as set forth in claim 32 wherein a spacing between said first and second sensing means is an integral multiple of the respective spacing of the markings from each other.

35. An arrangement as set forth in claim 32 including an alarm means, wherein said signal evaluation means relates the sensing means to each other in respect of time in dependence on a spacing between the first and second sensing means and a speed of travel of the drive belt and is adapted to actuate said alarm means when the sensing signals produced by the first and second sensing means differ from each other in respect of time by more than a predetermined value.

36. An arrangement as set forth in claim 32 wherein said markings on said drive belt are in the form of lines extending transversely with respect to the direction of movement of the drive belt.

37. An arrangement as set forth in claim 32 and including a belt tensioning means.

38. An arrangement as set forth in claim 37 and further comprising means for detecting transverse oscillations of said drive belt and for comparing said detected transverse oscillations with a predetermined tolerance, said belt tensioning means being adapted to be actuated to re-tension the belt in response to said transverse oscillations exceeding said predetermined tolerance.

39. An arrangement as set forth in claim 28 wherein said belt tensioning means is controlled by said detecting means for automatic actuation when said transverse oscillations exceed said predetermined tolerance.

40. An arrangement as set forth in claim 37 wherein said first and second sensing means for sensing the markings on the drive belt are adapted to monitor said drive belt in respect of admissible elongation thereof when said drive belt is re-tensioned by said belt tensioning means.

41. An arrangement as set forth in claim 40 wherein a slip signal is formed from a variation in a time sequence of a signal produced in dependence on the sensed zero reference marking on the rotary member and of the respective sensing signals which are obtained from the markings on the drive belt and which correspond to a respective circumference of the rotary member.

42. An arrangement as set forth in claim 41 wherein said slip signal forming means operate on a pulse train which is obtained from said sensing signals and which corresponds to a revolution of the rotary member.

43. An arrangement as set forth in claim 32 including a belt tensioning means, wherein the belt tensioning means is actuated in dependence on said slip signal.

44. An arrangement as set forth in claim 32 wherein the slip signal is used for slip compensation purposes in angular positioning of the rotary member.

* * * * *